(12) United States Patent
Fourney et al.

(10) Patent No.: US 12,012,244 B2
(45) Date of Patent: Jun. 18, 2024

(54) SORTING SYSTEM SORTING PACKAGES INTO BAGS

(71) Applicant: Laitram, L.L.C., Harahan, LA (US)

(72) Inventors: Matthew L. Fourney, Laurel, MD (US); Bryant G. Ragan, Metairie, LA (US); Mark Costanzo, New Orleans, LA (US); Destin Jacob Bailey, Marrero, LA (US); Christopher Alan Brupbacher, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 71 days.

(21) Appl. No.: 17/920,189

(22) PCT Filed: Apr. 13, 2021

(86) PCT No.: PCT/US2021/026997
§ 371 (c)(1),
(2) Date: Oct. 20, 2022

(87) PCT Pub. No.: WO2021/247146
PCT Pub. Date: Dec. 9, 2021

(65) Prior Publication Data
US 2023/0159203 A1    May 25, 2023

Related U.S. Application Data

(60) Provisional application No. 63/033,376, filed on Jun. 2, 2020.

(51) Int. Cl.
*B65B 43/54* (2006.01)
*B07C 3/02* (2006.01)
(Continued)

(52) U.S. Cl.
CPC ............... *B65B 43/54* (2013.01); *B07C 3/02* (2013.01); *B65B 5/045* (2013.01); *B65B 35/12* (2013.01); *B65G 47/44* (2013.01)

(58) Field of Classification Search
CPC ......... B65B 43/54; B65B 5/045; B65B 35/12; B65B 67/1227; B65B 67/1244;
(Continued)

(56) References Cited

U.S. PATENT DOCUMENTS 2,363,699 A * 11/1944 Smith ................. B65B 67/1244
312/297
3,698,153 A * 10/1972 Lieberman ............... B65B 5/08
53/260

(Continued)

FOREIGN PATENT DOCUMENTS

JP          07-329940 A       12/1995

*Primary Examiner* — Hemant Desai
*Assistant Examiner* — Mobeen Ahmed
(74) *Attorney, Agent, or Firm* — James T. Cronvich

(57) ABSTRACT

A sorting conveyor and bagging device for selectively depositing packages in bags through collapsible openings in the bags themselves or in sleeves protruding from the mouths of bags. Sliders are positioned between the bags at the ends of chutes. Actuators slide the sliders along the slide tracks to selectively open and position the opening to one bag to receive packages from the chute while the opening to the other bag is closed and positioned out of the way.

26 Claims, 10 Drawing Sheets

(51) Int. Cl.
  *B65B 5/04* (2006.01)
  *B65B 35/12* (2006.01)
  *B65G 47/44* (2006.01)

(58) Field of Classification Search
  CPC . B65B 2067/1294; B65B 43/26; B65B 43/42; B65B 67/1238; B65B 2067/1283; B65B 67/12; B65B 43/123; B65B 43/267; B07C 3/02; B07C 5/36; B07C 3/08; B65G 47/44
  See application file for complete search history.

(56) References Cited

U.S. PATENT DOCUMENTS

| | | | | |
|---|---|---|---|---|
| 3,869,065 | A * | 3/1975 | Wang | B65B 67/1244 |
| | | | | 493/255 |
| 4,301,842 | A * | 11/1981 | Kuckhermann | B65B 43/30 |
| | | | | 53/384.1 |
| 4,700,755 | A * | 10/1987 | Banys | B65B 43/28 |
| | | | | 53/384.1 |
| 4,798,042 | A * | 1/1989 | Davis | B65B 43/36 |
| | | | | 53/385.1 |
| 4,979,705 | A * | 12/1990 | Bovitz | B65B 67/1238 |
| | | | | 248/97 |
| 5,771,665 | A * | 6/1998 | Nelson | B65B 43/56 |
| | | | | 53/570 |
| 5,802,817 | A * | 9/1998 | Hood | B65B 43/28 |
| | | | | 53/469 |
| 6,658,823 | B2 * | 12/2003 | Johnsen | B65B 43/30 |
| | | | | 53/384.1 |
| 7,421,834 | B1 * | 9/2008 | Doolan | B65B 43/54 |
| | | | | 222/452 |
| 8,479,947 | B1 * | 7/2013 | Albrecht, II | A45C 11/20 |
| | | | | 220/524 |
| 8,672,118 | B2 * | 3/2014 | Janzen | B65G 47/61 |
| | | | | 198/680 |
| 8,919,529 | B1 * | 12/2014 | Erceg | B65G 47/962 |
| | | | | 198/360 |
| 9,010,072 | B2 * | 4/2015 | May | B65B 5/045 |
| | | | | 53/284.7 |
| 10,029,813 | B2 * | 7/2018 | Lorger | B65B 43/28 |
| 11,033,935 | B2 | 6/2021 | Czukor et al. | |
| 11,390,463 | B1 | 7/2022 | Stone et al. | |
| 11,459,141 | B1 * | 10/2022 | Kaldahl | F42B 39/26 |
| 2001/0035416 | A1 * | 11/2001 | Dodson | A47K 10/421 |
| | | | | 220/826 |
| 2004/0055250 | A1 * | 3/2004 | Main | B65B 43/28 |
| | | | | 53/386.1 |
| 2005/0061930 | A1 | 3/2005 | Hendzel | |
| 2011/0036853 | A1 * | 2/2011 | Ramsey | B65D 25/02 |
| | | | | 220/676 |
| 2011/0108499 | A1 | 5/2011 | So | |
| 2013/0105489 | A1 * | 5/2013 | Burgess | B65D 25/06 |
| | | | | 220/532 |
| 2015/0097091 | A1 * | 4/2015 | Felsenthal | B65F 1/1468 |
| | | | | 248/97 |
| 2017/0088302 | A1 * | 3/2017 | Auf Der Maur | B65G 9/004 |
| 2017/0137155 | A1 * | 5/2017 | Pape | B65B 1/04 |
| 2017/0291737 | A1 * | 10/2017 | Pierce | B65D 51/1611 |
| 2019/0071219 | A1 * | 3/2019 | Ueda | B65G 17/20 |
| 2019/0100368 | A1 * | 4/2019 | Zagar | B07C 3/008 |
| 2019/0300294 | A1 | 10/2019 | Fenile | |
| 2020/0390205 | A1 * | 12/2020 | Hibino | A45B 25/24 |
| 2021/0139064 | A1 * | 5/2021 | Felsenthal | B62B 3/106 |
| 2021/0188532 | A1 * | 6/2021 | Trout | B65D 90/54 |
| 2021/0395022 | A1 * | 12/2021 | Ramseier | B65G 17/32 |
| 2022/0410213 | A1 * | 12/2022 | Young | B65G 47/19 |
| 2023/0073458 | A1 * | 3/2023 | Wallman-Carlsson | |
| | | | | G07D 11/125 |
| 2023/0211960 | A1 * | 7/2023 | Costanzo | B65G 47/44 |
| | | | | 198/370.01 |
| 2023/0294913 | A1 * | 9/2023 | Collins | B65F 1/067 |
| | | | | 220/495.06 |
| 2023/0373711 | A1 * | 11/2023 | Morand | B65F 1/06 |

* cited by examiner

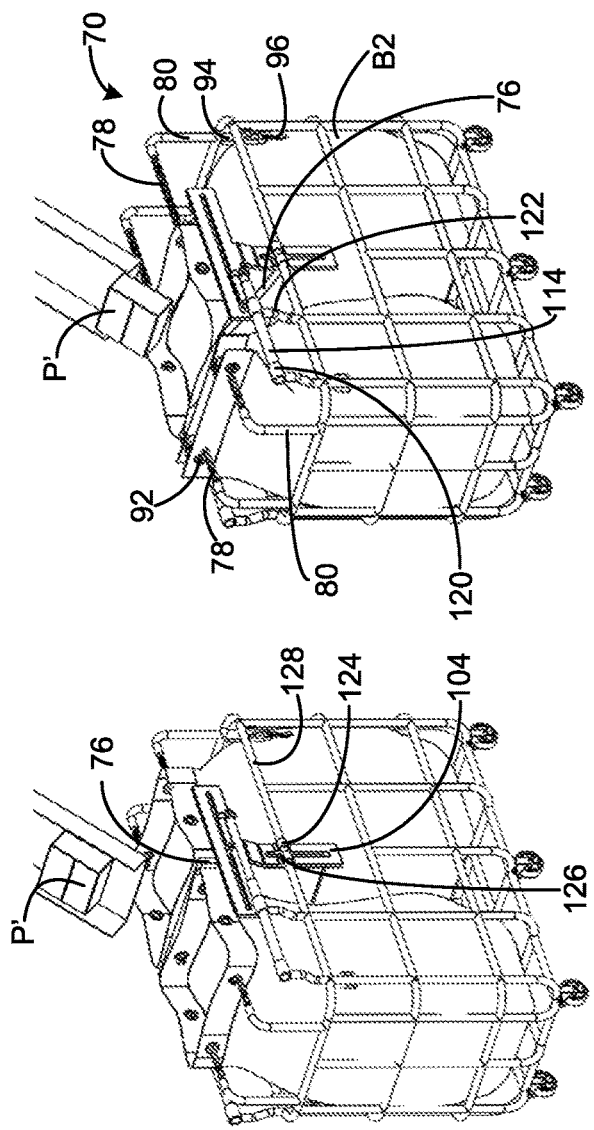
FIG. 19C
FIG. 19B
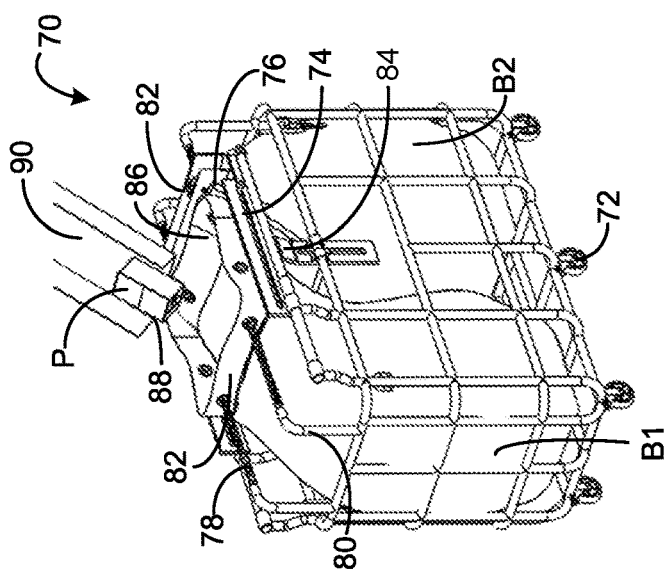
FIG. 19A

SORTING SYSTEM SORTING PACKAGES INTO BAGS

BACKGROUND

The invention relates generally to power-driven conveyors and more particularly to sorting conveyors sorting packages into multiple bags at multiple discharges.

In various industries such as in package- and parcel-handling, sorting conveyors are used to sort packages to assigned destinations, such as bags. Often the packages are discharged from a main sorting conveyor onto chutes leading to an assigned destination bag. If many sorting destinations are required, the main sorting conveyor can be long and occupy significant floor space.

SUMMARY

One version of a bagging device embodying features of the invention comprises a pair of slide tracks and a slider movable along the slide tracks. and attachable to two bags. An actuator slides the slider along the slide tracks in a first direction opening an opening into a first one of the bags and closing an opening into a second one of the bags and in an opposite second direction opening an opening into the second one of the bags and closing the opening into the first one of the bags.

One version of a sorting system embodying features of the invention comprises first and second destination bags and a bagging device. The bagging device includes first and second slide tracks and a slider movable along the first and second slide tracks and attachable to the first and second destination bags. An actuator coupled to the slider slides the slider along the first and second slide tracks in a first direction opening an opening into the first destination bag and closing an opening into the second destination bag and in an opposite second direction opening the opening into the second destination bag and closing the opening into the first destination bag.

BRIEF DESCRIPTION OF THE DRAWINGS

FIGS. 19A-19C are isometric views of another version of a bagging device embodying features of the invention shown in first, transitional, and second sorting positions.

DETAILED DESCRIPTION

Figure 1:
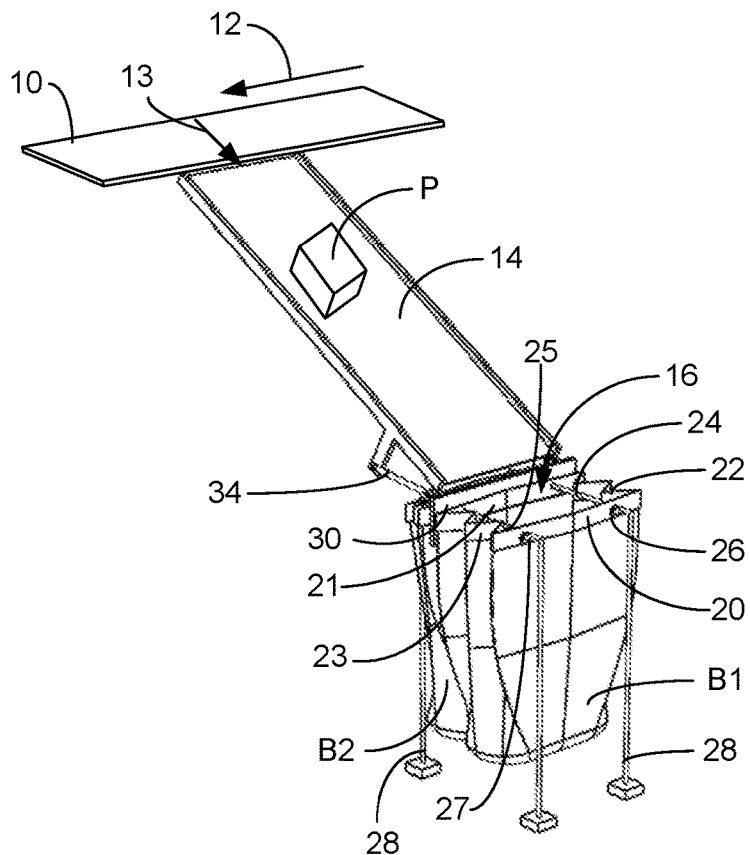
FIG. 1 is an isometric view of one version of a sorting conveyor embodying features of the invention in a bagging device for sorting packages selectively from a chute to assigned destination bags.

A portion of a sorting system embodying features of the invention is shown in FIG. 1. The sorting system comprises a main sorting conveyor 10, which can be realized as a powered roller conveyor, a shoe sorter, or a conveyor belt advancing packages in a main conveying direction 12. Selected Packages P are sorted off the main sorting conveyor 10 in the direction of arrow 13 onto chutes 14 by conventional diverting mechanisms suitable for use with the kind of sorting conveyor used. Examples of conventional diverting mechanisms include shoes, pushers, cross belts, swivel sorters, and activated roller belts, such as the INTRALOX® Series 7000 activated roller belt manufactured and sold by Intralox, L.L.C. of Harahan, Louisiana, U.S.A.

Packages P assigned a destination in either of the bags B1, B2 are sorted off the main conveyor 10 onto the chute 14. Packages assigned to other destinations along the main sorting conveyor 10 are sorted off onto chutes at those sorting locations and into the assigned bags.

Figure 2A:
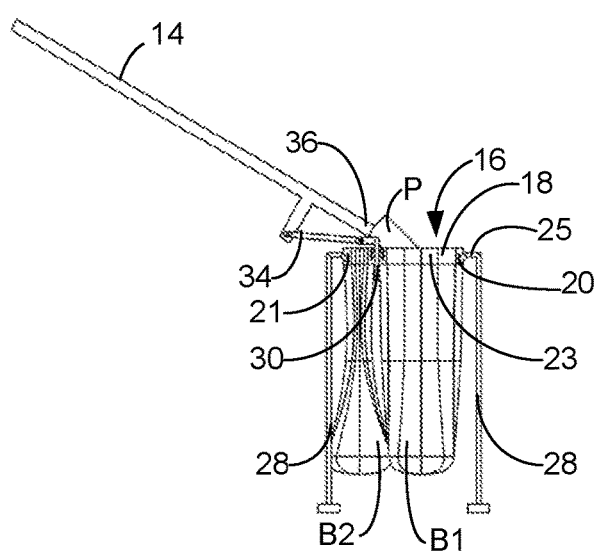
FIGS. 2A and 2B are side elevation views of the bagging device of FIG. 1 shown in two sorting positions.
Figure 2B:
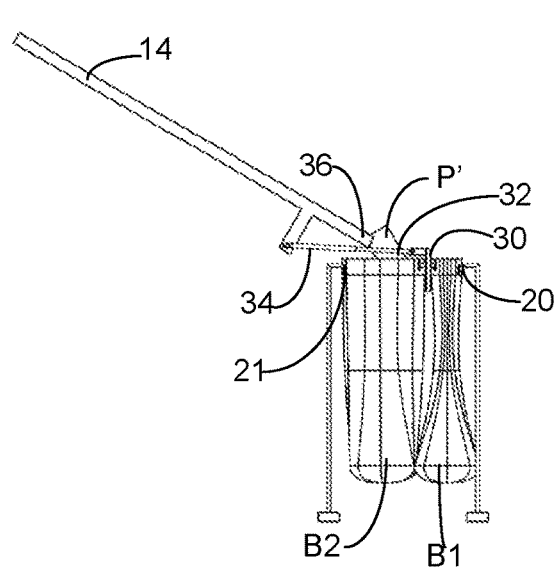

As also shown in FIGS. 2A and 2B, the bags B1, B2 each have a mouth 16 bounded by a lip 18. The lip 18 has two opposing flat sides 20, 21 joined by two pleated sides 22, 23, which make the bags collapsible. The bags B1, B2 are suspended from a pair of slide tracks in the form of rails, or tusks 24, 25, in a bagging device. Eyelets 26, 27 in the flat side 20, 21 of the bag lips 18 slidably receive the tusks 24, 25. The tusks 24, 25 are supported in parallel in a horizontal plane by legs 28 standing up from the floor.

A slider 30 in the bagging device is slidably mounted on the tusks 24, 25 between the lips 18 of the two bags B1, B2. In particular the slider 30 is mounted between the flat side 21 of the first bag B1 and the flat side 20 of the second bag B2. The slider 30 is attached to the arm 32 of an actuator 34, such as a linear actuator, attached at one end at the bottom side of the chute 14. The slider 30 is also attached to the bags B1, B2. The actuator 34 slides the slider 30 along the tusks 24, 25 in a first direction to a first position, shown in FIG. 2A, in which the mouth 16 of the first bag B1 is open and forms an opening into the first bag and in which the mouth of the second bag B2 is closed, and in an opposite second direction to a second position, shown in FIG. 2B, in which the mouth of the second bag is open and forms an opening into the second bag and in which the mouth of the first bag is closed. In FIG. 2A a package P, assigned to the destination bag B1, rides down the chute 14 into the open bag B1. In FIG. 2B a package P' assigned to the destination bag B2, rides down the chute 14 into the open bag B2.

In the first position the slider 30 and the first flat side 21 of the first bag B1 are positioned just below the lower end 36 of the chute 14. In the second position the slider 30 and the lip's flat side 20 of the second bag B2 are positioned outward of the lower end 36 of the chute 14. In both positions the other flat side 20 of the first bag B1 and the other flat side 21 of the second bag B2 remain in position on the tusks 24, 25. In that way the actuator 34 acting on the slider 30 opens one bag while closing the other and positions the mouth of the open bag to receive a package exiting the chute 14.

Figure 3A:
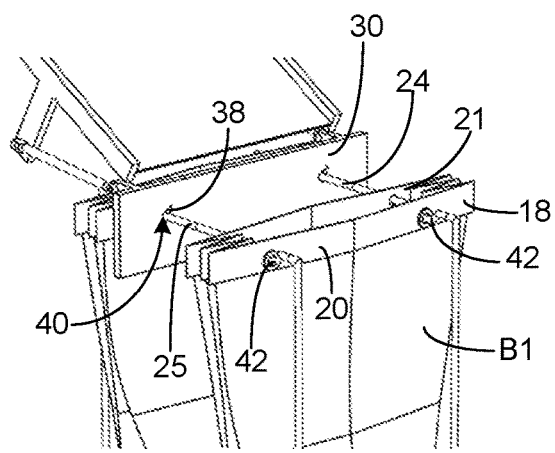
FIGS. 3A-3E are isometric views depicting the sequence of steps taken to remove filled bags from the bagging device of FIG. 1.
Figure 3B:
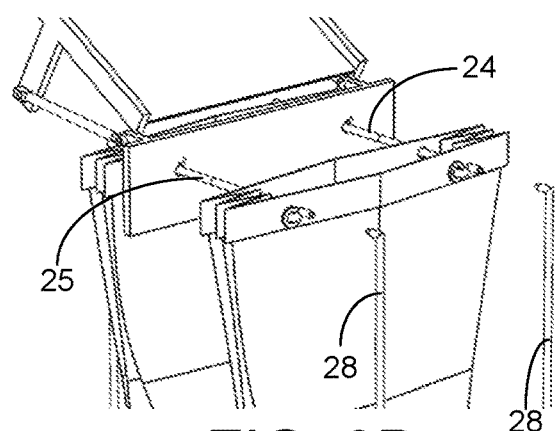
Figure 3C:
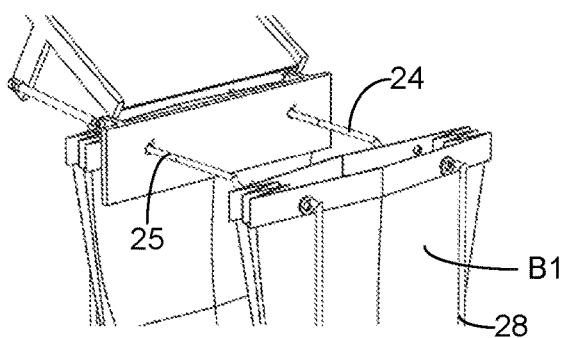
Figure 3D:
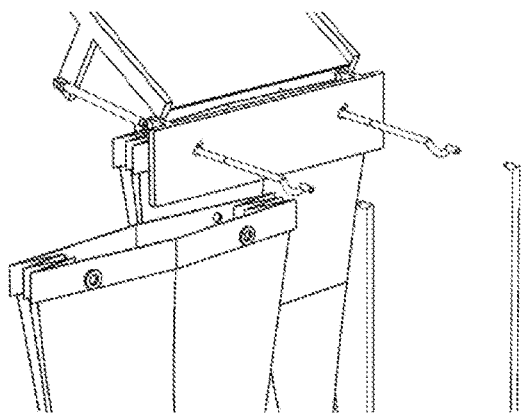
Figure 3E:
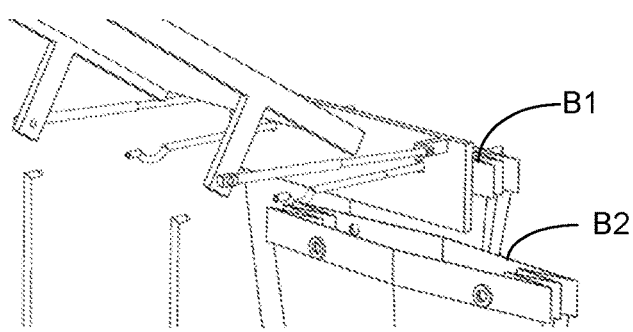
Figure 4:
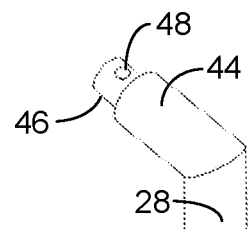
FIG. 4 is an isometric view of a latching mechanism used to connect and disconnect slide tracks in the bagging device of FIG. 1 so that filled bags can be removed and replaced by empty bags.

FIGS. 3A-3E depict the sequence of removing bags from the tusks. As shown in FIG. 3A, a bag B1 to be removed is first disconnected from the slider 30. The connection can be formed by hooks 38 on the bag's lip 18 extending through holes 40 in the slider 30, but other connections, such as snaps on the slider and mating snaps on the bags' lips 18, could be used. (FIG. 3A also shows detents 42—dips in the tusks—that serve as retainers loosely retaining the outer flat side 20 of the lip 18 of the first bag B1 in place.) In FIG. 3B, the tusks 24, 25 are pulled from the legs 28 at the outer end of the bag support assembly. As shown in FIG. 4, the top end 44 of each leg 28 has a narrow diameter stub 46 with a ball lock pin 48 that is received in the hollow end of the tusks 24, 25. With the legs 28 supported from the tusks 24, 25, the bag B1 is slid outward along the tusks until it clears their ends as shown in FIG. 3C. Once clear of the tusks 24, 25, the bag B1 can be carried off, as shown in FIG. 3D. The removal of the second bag B2 is accomplished similarly, as shown in FIG. 3E. To replace the bags, the process is reversed.

Figure 6:
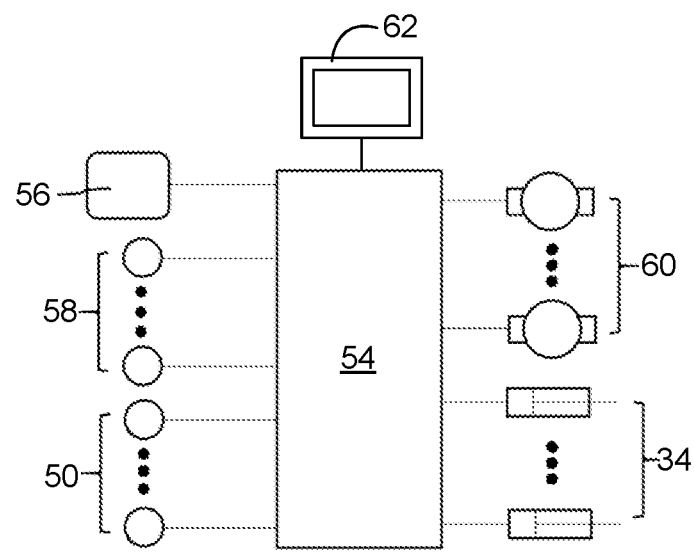
FIG. 6 is a block diagram of a control system for the sorting conveyor of FIG. 1.

The sorting conveyor is controlled by a controller 54, such as a programmable logic controller or other processor or programmable computer, as shown in FIG. 6. The controller, executing program steps in its program memory, receives package identifying data from a scanner 56 scanning all the packages. From that data the controller 54 assigns each package to a destination bag. Position sensors 58 along the main sorting conveyor provide position information to the controller 54 that enable each package to be tracked. From weight signals sent to the controller 54 by load sensors 50 at the chutes, the controller detects packages delivered to the bags and confirms correct deliveries, reports missorts (packages sorted to the wrong destination bag), reports undelivered packages, and reports full bags. The controller 54 notifies operators of those operational issues on a monitor 62 or with an indicator light or an audible alarm or other alert. The controller 54 also controls motors 60 that drive the main conveyor and the slider actuators 34 at each chute.

Figure 5:
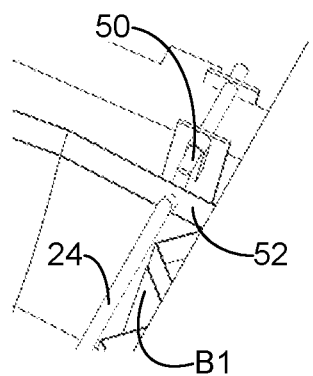
FIG. 5 is an enlarged view of a load sensor on a slide track for detecting the delivery of a package to a destination bag.

It can happen that a package is sorted to the wrong destination bag. FIG. 5 shows the load sensor 50 mounted to a plate 52 slidably attached at a top end to the tusk 24. The other end of the plate 52 is stationary. When a package lands in the open bag B1, the tusk 24 deflects downward against the load sensor 50, which then reports the increased weight of the bag B1 indicating the reception of a package in one of the bags. The load sensor 50 reports the weight to the sorting-conveyor controller, which interprets weight increases as package detections. And with knowledge of the assigned package destination, the states of the sliders at each chute, and the position of each assigned bag, the controller can determine if the package has been missorted. A load sensor can be attached to each tusk or to only one.

Figure 7:
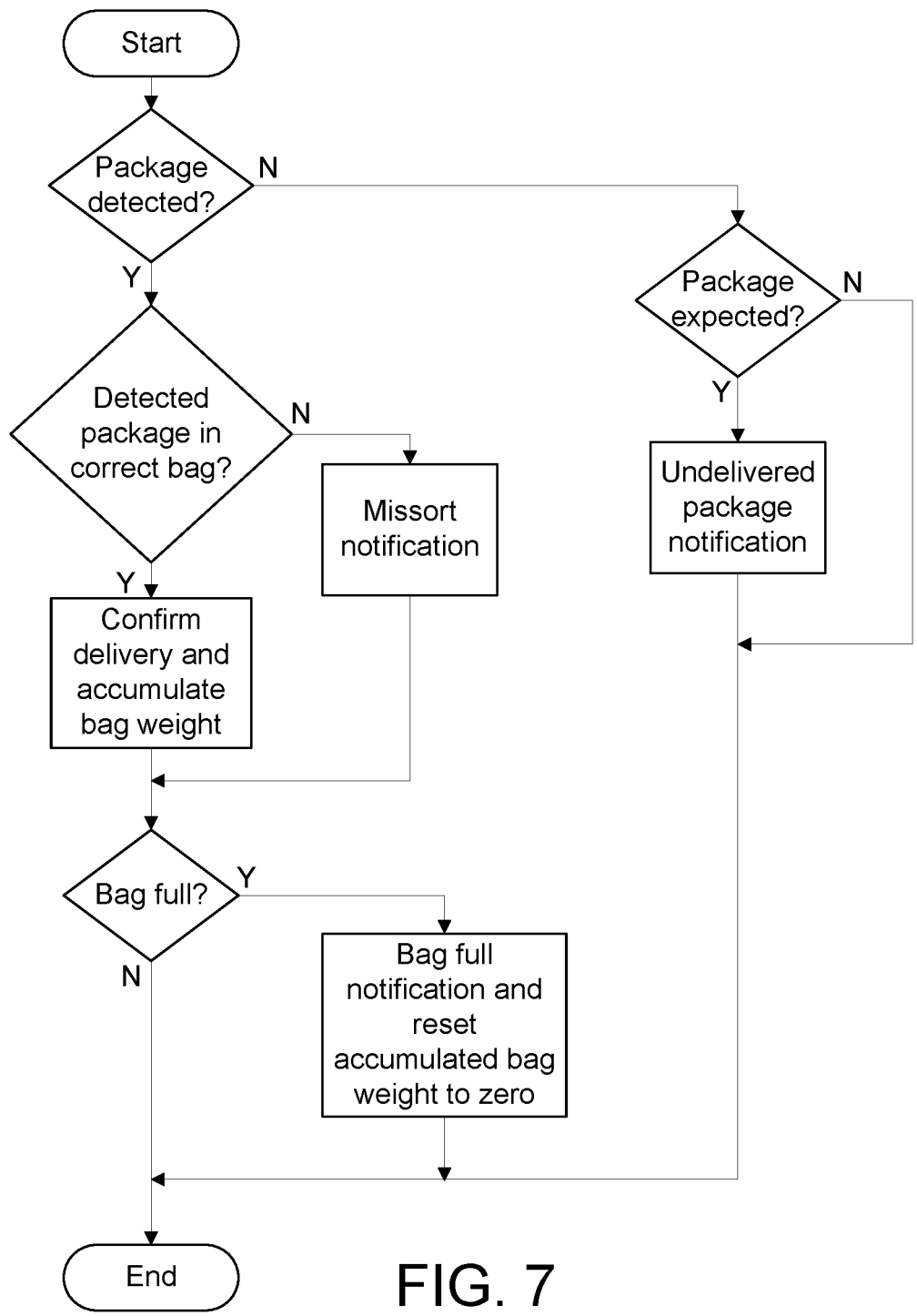
FIG. 7 is a flowchart of the program steps executed by a controller usable with the bagging device of FIG. 1 and the load sensors of FIG. 5 to monitor the sorting operation.

The program steps in program memory executed by the controller to detect and report missorted packages are shown in FIG. 7. The weight signals from the load sensors, which are continuously monitoring the bags, are used by the controller to detect the reception of a package in a bag. When a package is detected, the controller then determines if the package has been missorted, i.e., delivered to the wrong bag, as described in the previous paragraph. If a package is determined to have been delivered to the wrong destination bag, the controller notifies an operator of a bag with a missorted package by means of an indicator light, a message or indication on a display, an alarm, or other alert. Otherwise, the controller confirms the delivery of a package to a correct destination bag and accumulates the bag's weight. In either event the controller then determines if the accumulated weight of the bag exceeds a maximum weight value. If so, the controller notifies the operator that a bag is full so that it can be replaced with an empty bag and the controller then resets the accumulated weight to zero for the replacement bag. If a package was expected to have been delivered, but was not detected by the load sensor at the expected destination bag, the controller notifies the operator that a package was not delivered. If no package is detected and delivered and none was expected, the controller sends no alerts.

Figure 8:
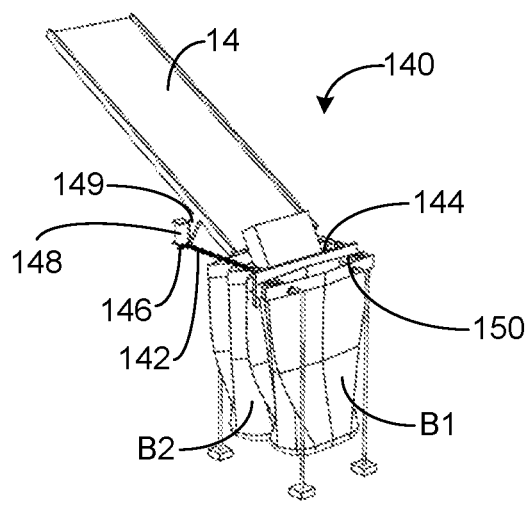
FIG. 8 is an isometric view of another version of a bagging device embodying features of the invention including a motorized rack-and-pinion actuator.

Another version of a bagging device is shown in FIG. 8. The bagging device 140 differs from the bagging device of FIG. 1 in that a motorized rack-and-pinion actuator is used instead of a linear actuator. The rack-and-pinion actuator comprises a rack gear 142 attached at one end to the slider 144. A pinion gear 146 on the shaft of a motor 148 engages the rack gear 142. Rotation of the motor's shaft and the pinion gear 146 translates the rack gear 142 and the slider 144 along its slide track 150 to open and close the openings into the bags B1, B2. A similar motorized rack-and-pinion actuator could be attached to the other side of the slider 144. The motor 148 is supported by motor mount 149 suspended from the chute 14, for example.

Figure 9:
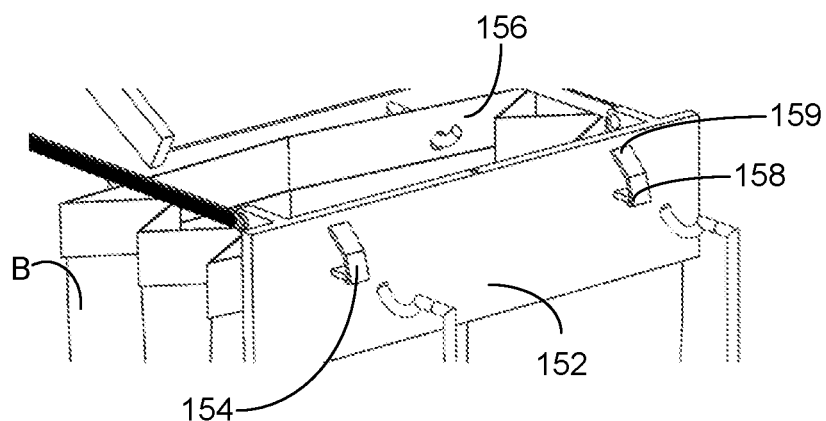
FIG. 9 is an enlarged view of a portion of the bagging device of FIG. 8 with one of the bags removed.
Figure 10:
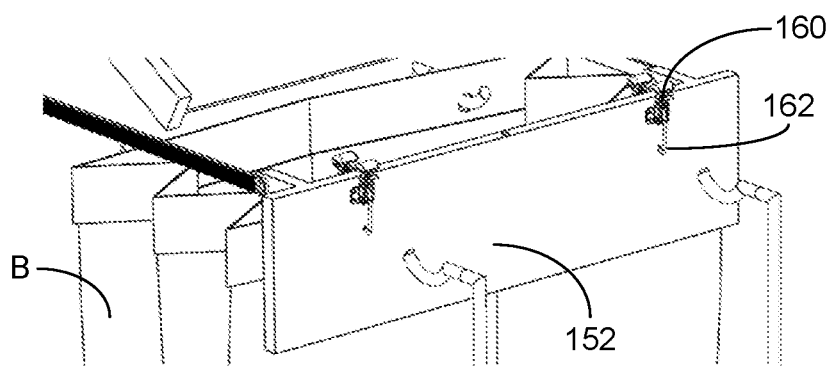
FIG. 10 is an enlarged view of another version of a bagging device as in FIG. 8, but with a different bag retainer.

Alternative means for removably attaching the bags B to a slider 152 are shown in FIGS. 9 and 10. In FIG. 9 spring gates 154 spaced apart laterally on both faces of the slider 152 are used instead of the hooks shown in FIG. 3A to attach the bags' lips 156 to the slider. The spring gates 154 have a lower pivot end 158 and an upper free end 159 that is biased against the slider 152 by a spring. The gates 154 extend through the eyelets on the bags' lips 156. The spring gates 154 open easily under slight outward pressure for bag installation and removal. Instead of spring gates, spring latches 160 through the bags' eyelets are used to releasably attach the bags B to the slider 152 in FIG. 10. Hooks 162 depending from the spring latches 160 hook the bags' eyelets to retain the bags B.

Figure 11:
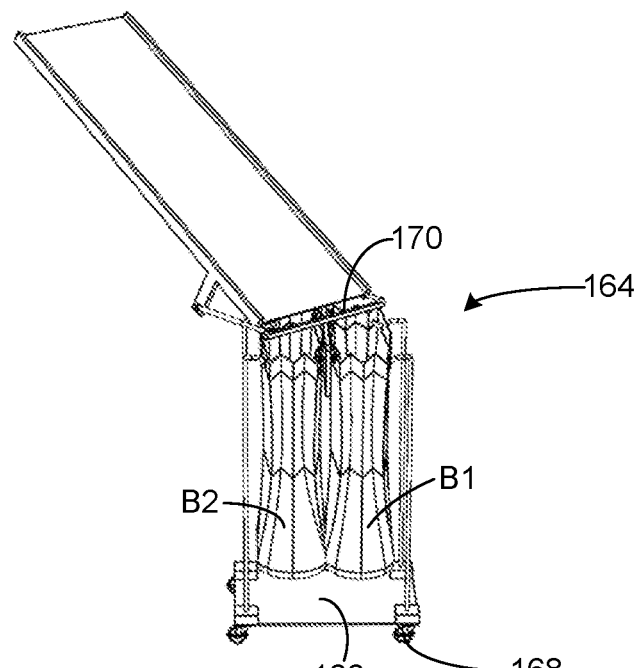
FIG. 11 is an isometric view of another version of a bagging device as in FIG. 8, but with a rotatable wheeled cart.

FIG. 11 shows a bagging device 164 with a wheeled platform 166 that allows the resulting bag cart to rotate for easy bag insertion and removal. The platform 166 has caster wheels 168 at each corner.

Figure 12:
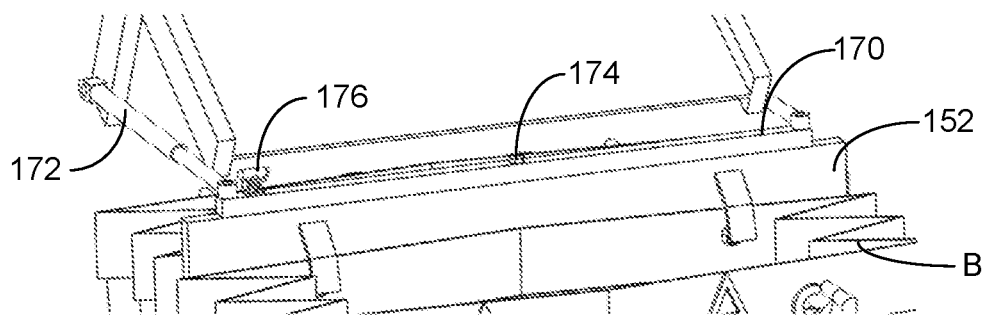
FIG. 12 is an enlarged view of an upper portion of the bagging device of FIG. 11.

As shown in FIG. 12, a locking bar 170, to which the actuators 172 are attached at each end, sits atop the slider 152. A bolt 174 has an unthreaded shank between the bolt head and an opposite threaded end. The bolt 174 extends through an unthreaded through hole in the top center of the locking bar 170 and is screwed into a threaded hole in the top center of the slider 152. In that way the slider 152, the bolt 174, and the bags B1, B2 can be rotated on the caster wheels 168 relative to the locking bar 170, as shown in FIG. 11, for easy bag replacement.

Figure 13A:
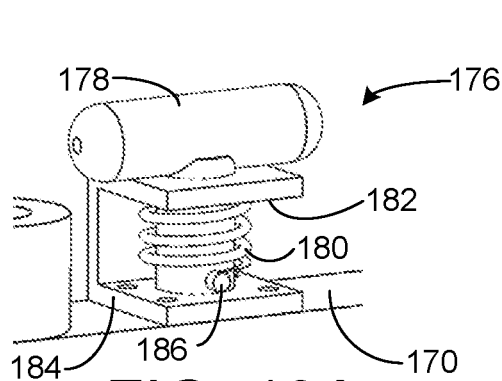
FIGS. 13A and 13B are enlarged views of a locking pin in locked and unlocked positions in the bagging device of FIG. 11.
Figure 13B:
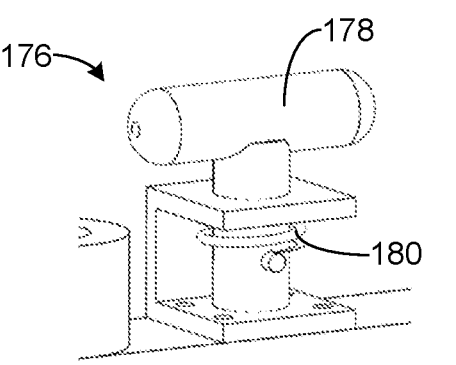

A locking pin 176 extends through a hole in the locking bar 170 and into an aligned hole in the top of the slider 152 to prevent rotation of the slider relative to the locking bar during normal operation of the bagging device. When a bag B has to be replaced, an operator lifts the locking pin 176 by its handle 178 from the locked position shown in FIG. 13A to the unlocked position shown in FIG. 13B. A spring 180 coiled around a drawbar portion of the locking pin 176 between a spring seat 182 formed on the bottom face of a U-shaped pin support 184 fastened to the top of the locking bar 170 and a spring-retainer stub 186 biases the locking pin into its locked position in FIG. 13A. To unlock the slider 152 from the locking bar 170, the operator pulls the handle 178 upward against the spring pressure to lift the end of the locking pin 176 from the hole in the slider so that the bagging device can be rotated for access to the bags.

Figure 14:
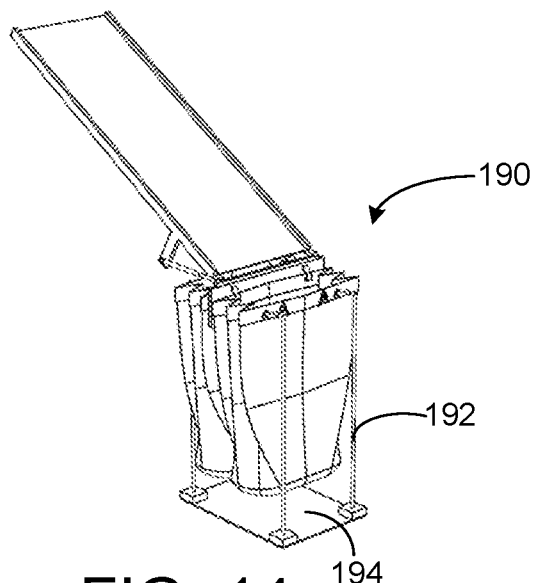
FIG. 14 is an isometric view of a bagging device as in FIG. 11 mounted on a rotatable platform.
Figure 15:
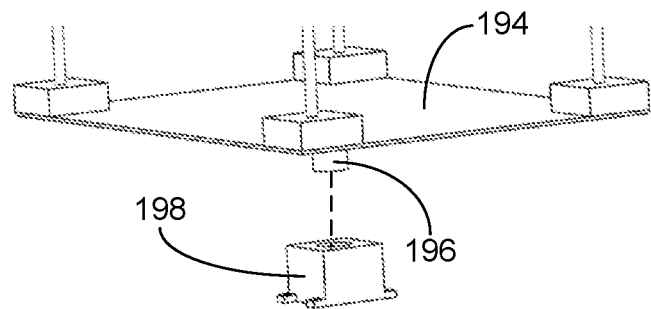
FIG. 15 is an enlarged view of the rotatable platform of FIG. 14.

Instead of a rotatable bagging device with caster wheels as in FIG. 11, the bagging device 190 of FIG. 14 is wheelless. Its legs 192 are mounted to a lower platform 194 that has a pivot pin 196 extending down centrally from its bottom side as shown in FIG. 15. The pivot pin 196 is received in a bearing block 198 mounted to the floor. The bearing block 198 supports the bagging device 190 and allows it to be rotated for bag replacement.

Figure 16:
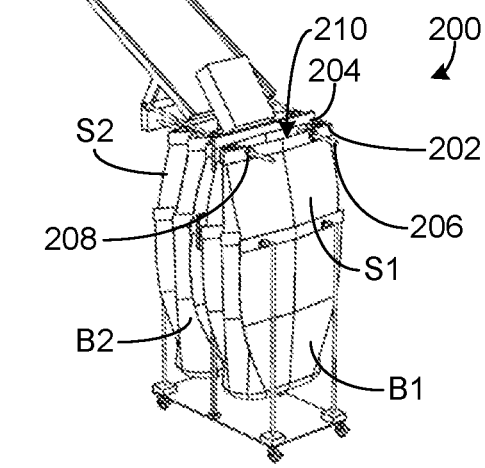
FIG. 16 is an isometric view of another version of a bagging device embodying features of the invention including collapsible bag sleeves.

Another version of a bagging device 200 is shown in FIG. 16. One difference from the previously described bagging devices is that sleeves S1, S2 are interposed between the chute 14 and the bags B1, B2. The upper lips 202 of the sleeves are attached to a slider 204 and to slide tracks 206 through eyelets 208. The sleeves S1, S2 extend downward from their lips 202 and into the mouths of the bags B1, B2. The mouths of the bags B1, B2 can remain permanently open, while the mouths 210 of the sleeves S1, S2 serve as collapsible openings into the bags.

Figure 17:
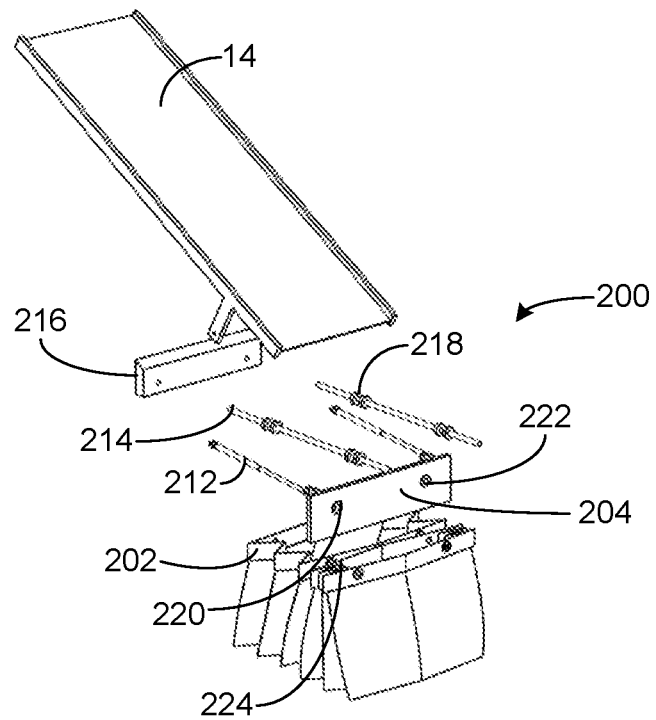
FIG. 17 is an exploded view of the upper portion of the bagging device of FIG. 16.

As shown in FIG. 17, the slider 204 is attached to actuators 212, which move the slider and the upper lips 202 of the sleeves S1, S2, along two rod-like rails 214 forming slide tracks. The rails 214 are attached at the end to a rail support 216 mounted to the bottom of the chute 14. The rails 214 are also supported by the slider 204 and its attachment to the actuators 212. Sleeve stops 218 in the form of pairs of rings spaced apart along the length of the rails 212 define a translation range for the sleeves S1, S2, along the rails, between each pair. And the outer lips of the sleeves S1, S2 are retained between the stops 218 of each pair of rings, which serve as sleeve retainers. Ring magnets 220 around the eyelets 222 in the slider 204 attract ferrous metal rings 224 surrounding the eyelets in the sleeves' lips 202 to hold the sleeves S1, S2 to the slider. As the slider 204 is moved back and forth on the slide tracks 214, it opens one sleeve, while closing the other so that packages dropped in the open sleeve are deposited in the associated bag.

Figure 18:
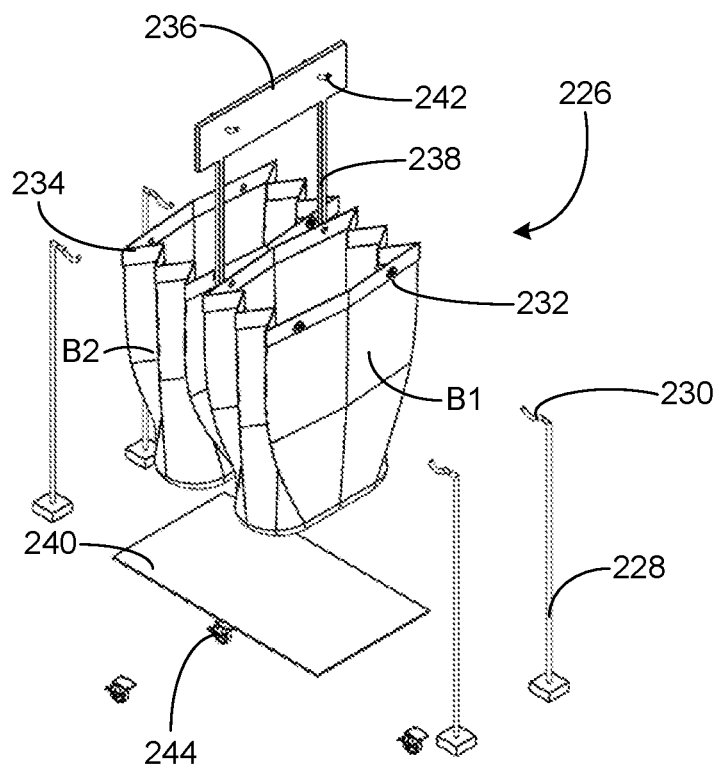
FIG. 18 is an exploded view of the lower portion of the bagging device of FIG. 16.

The bags B1, B2 are supported in a bag stand 226 as shown in FIG. 18. The bag stand 226 has four legs 228 each with a hook 230 at the top. The bags B1, B2 are suspended at their outer sides from the hooks 230 received in eyelets 232 in the bags' lips 234. A central bag support stand 236 has legs 238 mounted to a lower platform 240. The bag support stand 236 has hooks 242 on each face to which the inner lips of the bags B1, B2 are hooked through eyelets. Caster wheels 244 may be attached to the bottom of the platform 240 to allow the bag stand to be moved easily.

Another version of a bagging device for depositing packages in bags is shown in FIG. 19A. The bagging device comprises a bag support assembly 74 and a cart 70 constructed of tubular members. The cart 70 has caster wheels 72 at the bottom in contact with the floor. At the upper end of the cart 70 is the bag support assembly 74 supporting two bags B1, B2 on opposite sides of a slider 76. The bag support assembly 74 comprises the slider 76, coil springs 78 attached at one end to posts 80 at the top of the cart 70 and at the other end to the outer sides of lips 82 lining the tops of the bags B1, B2, and a slide actuator assembly 84 that selectively moves the slider to open and close the bags.

FIGS. 19A-19C illustrate the sequence of depositing a first package P in the first bag B1 and then a second package P' in the second bag B2. In FIG. 19A the slider 76 is shown in a first position at an end of its range of translation closing the second bag B2 and opening the mouth of the first bag B1 so that the inner side 86 of the first bag's lip 82 is under the lower end 88 of a chute 90 to receive the package P. FIG. 19B shows the slider 76 in a transition position as it slides to a second position to close the first bag B1 and to open the second bag B2 to receive a package P' from the chute 90 as shown in FIG. 19C. The coil springs 78 attached to the posts 80 at one end are attached to the outer sides of the lips 82 of the bags B1, B2 at the other end by hooks 98 through eyelets 92 in the lips. The springs 78 apply forces that bias the outer sides of the bags B1, B2 away from the slider 76, which helps keep the bags open during a package deposit. Hooks 94 on the cart 70 hook onto rings 96 attached to the sides of the bags B1, B2 to provide the main support for the bags.

Figure 20:
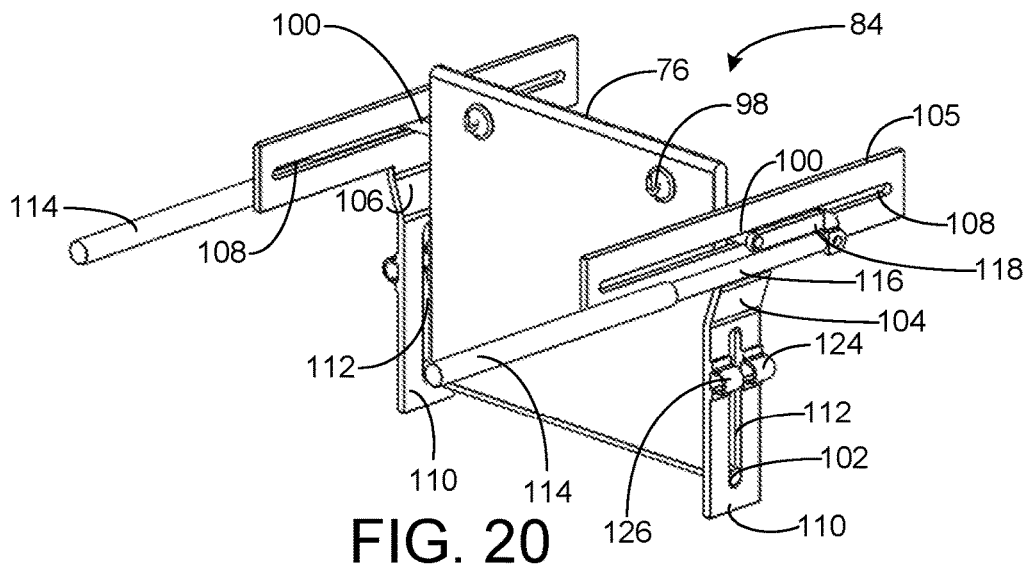
FIG. 20 is an enlarged isometric view of the slider assembly of FIGS. 19A-19C.

Details of the slider 76 and the slide actuator assembly 84 are shown in FIG. 20. The slider 76 is a plate with a pair of hooks 98 on each face of the plate for hooking into the bag's eyelets so that the inner lips of the bags move with the slider plate. Upper and lower stubs 100, 102 protrude laterally outward from opposite sides of the slider 76. T-shaped guides 104, 106 bracket the slider 76. The crossbars 105 of the guides 104, 106 have horizontal slots 108 in which the upper stubs 100 are received. The horizontal slots 100 in the crossbars 105 form slide tracks defining a translation range for the top end of the slider plate 76. The posts 110 of the T-shaped guides 104, 106 have vertical slots 112 that receive the lower stubs 102 of the slider 76 and give the slider the freedom of movement to tilt as the plate translates along the horizontal slots 108. Linear actuators 114 have extension arms 116 attached to the upper stubs 100 by couplings 118.

As shown in FIG. 19C, the actuators 114 are attached to the cart 70 by retaining rings 120 at the tops of outwardly bent upstanding tubular members 122. In FIG. 19A the actuators' arms 116 are shown extended to open the mouth of the first bag B1 and close the mouth of the second bag B2. In FIG. 19C the actuators' arms 116 are shown retracted to open the second bag B2 and close the first bag B1. As seen in FIGS. 19B and 20, retaining rings 124, 126 on the outer sides of the T-shaped guides 104 attached to horizontal members 128 of the cart 70 hold the guides in place.

Figure 21A:
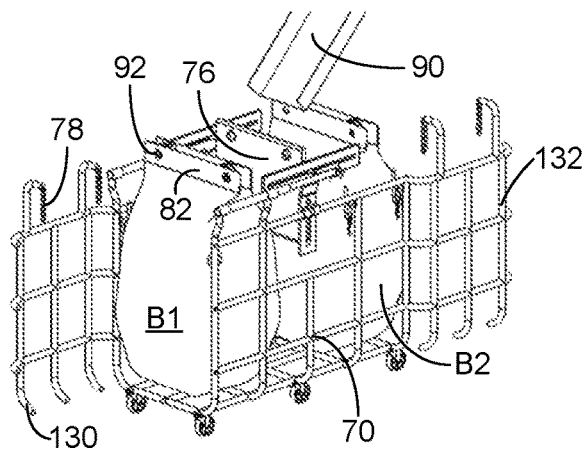
FIGS. 21A-21C are isometric views depicting the sequence of steps taken to remove filled bags from the bagging device of FIGS. 19A-19C.
Figure 21B:
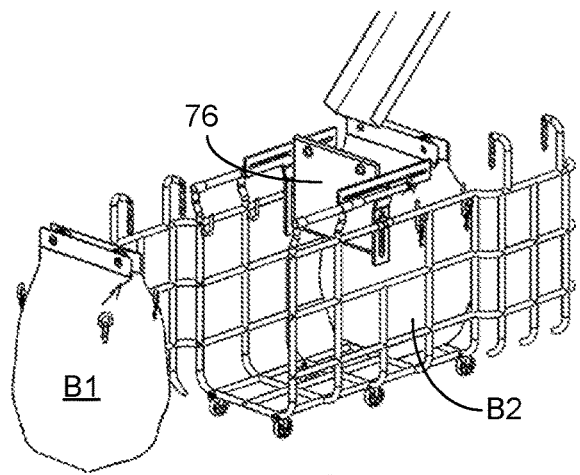
Figure 21C:
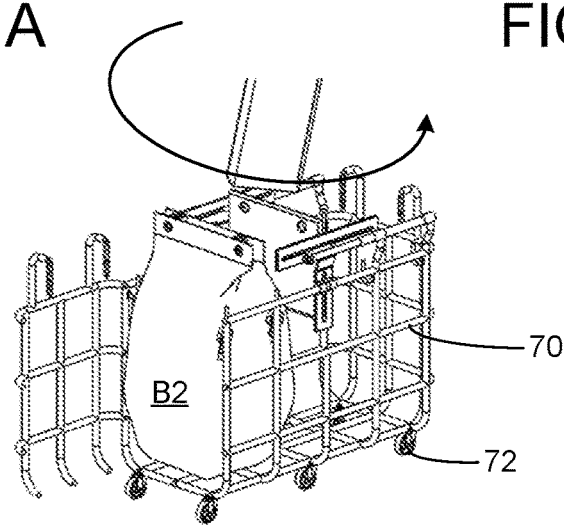

FIGS. 21A-21C show how the bags B1, B2 are removed from the cart 70. First, the coil springs 78 are unhooked from the eyelets 92 in the bags' lips 82. Then end gates 130, 132 attached to the carts' side frame at hinges are swung open as shown in FIG. 21A. Next, the first bag B1, which is outward of the chute 90, is unhooked from the slider plate 76 and removed through the open gateway in the end of the cart 70, as shown in FIG. 21B. As shown in FIG. 21C, the cart 70 is then rotated 180° or as far as necessary to access the second bag B2 and remove it through the other open end. Replacement bags are installed in the cart by performing the removal steps in reverse.

Although the invention has been described with respect to a few exemplary versions, other versions are possible. For example, the actuators in any of the versions can be realized as linear actuators, such as pneumatic, hydraulic, or electromagnetic actuators, as rack-and-pinion actuators, or by other equivalent devices capable of translating a slider along slide tracks. As another example, the various bagging devices could attach the bags or sleeves to the slides by hooks, spring gates, spring latches, magnetic attraction, or any attachment making bag replacement easy. And the term "package" is meant to generically refer to any conveyable objects, such as envelopes, cartons, boxes, and parcels, for example. And other features shown in some of the bagging devices are usable in others of the bagging devices. So, as these few examples suggest, the scope of the claims is not meant to be limited to the exemplary versions disclosed in detail.

What is claimed is:

1. A bagging device comprising:
   a pair of slide tracks;
   a slider movable along the slide tracks and attachable to two bags;
   an actuator coupled to the slider to slide the slider along the slide tracks in a first direction opening an opening into a first one of the bags and closing an opening into a second one of the bags and in an opposite second direction opening an opening into the second one of the bags and closing the opening into the first one of the bags.

2. The bagging device of claim 1 wherein the slider has stubs protruding from its laterally opposite sides and wherein the slide tracks comprise first and second guides having slots receiving the stubs.

3. The bagging device of claim 2 comprising springs attached to the bags to bias one side of their openings away from the slider.

4. The bagging device of claim 1 wherein the slide tracks comprise first and second rails extending through the slider and adapted to extend through the lips of bags.

5. The bagging device of claim 4 wherein the first and second rails each have first and second detents at spaced positions along the length of the rail to retain the sides of the bags opposite the slider.

6. The bagging device of claim 4 comprising a leg attached at each end of the first and second rails to support the rails in parallel, wherein the legs are detachable to slide a bag on or off the first and second rails.

7. The bagging device of claim 1 wherein the slider is attachable to bags by means of hooks, spring gates, spring latches, or magnetic attraction.

8. The bagging device of claim 1 comprising a locking bar atop the slider and pivot pin extending through the locking bar and affixed to the slider to allow the slider to rotate relative to the locking bar.

9. The bagging device of claim 8 comprising a locking pin affixed to the locking bar and extendable into slider into a locked position to prevent the slider from rotating relative to the locking bar and retractable from the locking bar into an unlocked position to allow the slider to be rotated relative to the locking bar.

10. The bagging device of claim 1 wherein the actuator is a linear actuator or a motorized rack and pinion.

11. The bagging device of claim 1 comprising sleeves attached to the slider and forming openings into the bags.

12. A sorting system for sorting packages comprising:
    first and second destination bags, each having an opening;
    a bagging device including:
       first and second slide tracks;
       a slider movable along the first and second slide tracks and attachable to the first and second destination bags;
       an actuator coupled to the slider to slide the slider along the first and second slide tracks in a first direction opening the opening into the first destination bag and closing the opening into the second destination bag and in an opposite second direction opening the opening into the second destination bag and closing the opening into the first destination bag.

13. The sorting system of claim 12 wherein the slider extends in width from a first end to a second end and in thickness from a first side adjacent the first destination bag to a second side adjacent the second destination bag and wherein the actuator includes first and second linear actuators having arms with distal ends attached to the second side of the slider at the first and second ends.

14. The sorting system of claim 12 wherein the openings into the first and second destination bags have lips surrounding mouths and wherein the first and second slide tracks comprise first and second rails extending through the slider and the lips of the first and second destination bags wherein the actuator slides the slider along the first and second rails.

15. The sorting system of claim 14 wherein the first and second rails each have first and second retainers at spaced positions along the length of the rail, wherein the first retainer retains a portion of the lip of the first destination bag's opening on the side of the lip opposite the slider and wherein the second retainer retains a portion of the lip of the second destination bag's opening on the side of the lip opposite the slider.

16. The sorting system of claim 15 wherein each of the first and second retainers is a detent in the first or second rail or pairs of rings received on the first or second rail retaining the lip.

17. The sorting system of claim 12 comprising a leg attached at each end of the first and second slide tracks to support the first and second slide tracks in parallel, wherein the legs are detachable to slide the first and second destination bags on or off the first and second slide tracks.

18. The sorting system of claim 12 comprising a chute declining from an upper end to a lower end positioned to drop packages through the openings into the first and second destination bags.

19. The sorting system of claim 12 comprising a load sensor mounted to the first or second slide track to detect the deposit of a package in the first or second destination bag.

20. The sorting system of claim 19 comprising a controller assigning each package to one of the first and second destination bags and receiving signals from the load sensor indicating the delivery of a package to the first or second destination bag, wherein the controller notifies an operator if the package was missorted.

21. The sorting system of claim 19 comprising a controller receiving signals from the load sensor indicating the weight of each package delivered to the first or second destination bags, accumulating the total weights of the first or second destination bags, comparing the accumulated weights to a maximum weight value, and notifying an operator that a destination bag is full if the accumulated weight exceeds the maximum weight value.

22. The sorting system of claim 12 comprising first and second sleeves attached to the slider and extending into the first and second bags to form the openings into the first and second destination bags.

23. The sorting system of claim 22 comprising a bag support stand between the first and second destination bags and below the slider supporting the first and second destination bags.

24. The sorting system of claim 12 wherein the bagging device is rotatable.

25. The sorting system of claim 12 wherein the slider has stubs protruding from its laterally opposite sides and wherein the first and second slide tracks comprise first and second guides having slots receiving the stubs.

26. The bagging device of claim 25 comprising springs attached to the openings of the first and second destination bags to bias the sides of their openings opposite the slider away from the slider.

\* \* \* \* \*

UNITED STATES PATENT AND TRADEMARK OFFICE
CERTIFICATE OF CORRECTION

PATENT NO. : 12,012,244 B2
APPLICATION NO. : 17/920189
DATED : June 18, 2024
INVENTOR(S) : Matthew L. Fourney et al.

Page 1 of 1

It is certified that error appears in the above-identified patent and that said Letters Patent is hereby corrected as shown below:

In the Specification

Column 3, Line 50: replace "enable" with "enables"

Column 4, Line 43: insert --a-- before "motor mount 149"

In the Claims

Claim 1 at Column 7, Line 28: replace "an opening" with "the opening"

Claim 8 at Column 7, Line 55: insert --a-- before "pivot pin"

Claim 26 at Column 9, Line 15: replace "bagging device" with "sorting system"

Signed and Sealed this
Thirtieth Day of July, 2024

Katherine Kelly Vidal
*Director of the United States Patent and Trademark Office*